C. W. GRAHAM.
WATERING DEVICE.
APPLICATION FILED DEC. 9, 1914.

1,177,030.

Patented Mar. 28, 1916.

Witnesses
A. G. Hague
Will Freeman

Inventor
Clayton W. Graham.
by Craig & Bair Attys

UNITED STATES PATENT OFFICE.

CLAYTON W. GRAHAM, OF DES MOINES, IOWA.

WATERING DEVICE.

1,177,030.

Specification of Letters Patent.  Patented Mar. 28, 1916.

Application filed December 9, 1914. Serial No. 876,364.

*To all whom it may concern:*

Be it known that I, CLAYTON W. GRAHAM, a citizen of the United States, residing at Des Moines, in the county of Polk and State of Iowa, have invented a certain new and useful Watering Device, of which the following is a specification.

The object of my invention is to provide a watering device for animals of simple, durable and inexpensive construction.

A further object is to provide a device of the general class mentioned of the type having a watering tank, and surrounding casings, spaced from the water tank, and adapted to receive a means for heating the water in the tank.

Still a further object is to provide such a device in which a tank and casing are provided with inset portions forming an entrance, and a watering trough to which animals may have access, which trough is so located as to be subject to the heating means.

Still a further object is to provide such a device having novel and improved means for supplying water to the tank.

Figure 1:
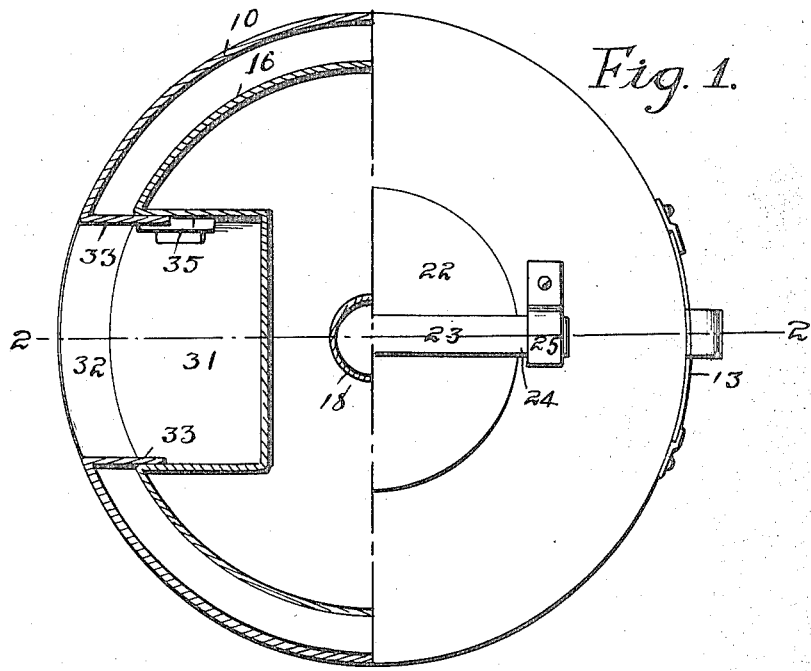
Figure 2:
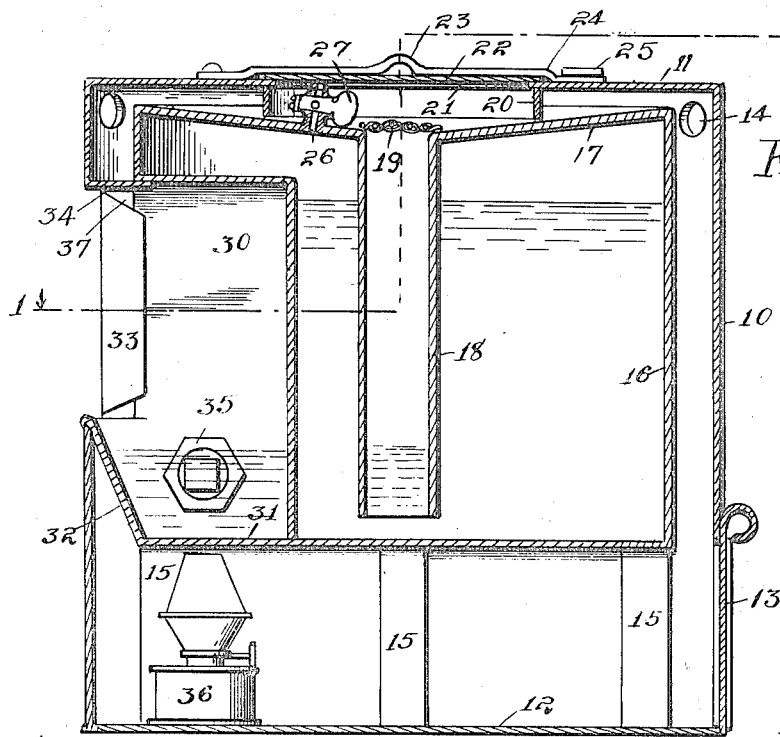

My invention consists in the construction, combination, and arrangement of the various parts of the device whereby the objects contemplated are attained, as hereinafter more fully set forth, pointed out in my claims, and illustrated in the accompanying drawings, in which:

Figure 1 shows a top or plan view taken on the line 1—1 of Fig. 2, of a watering device embodying my invention. Fig. 2 is a detail sectional view taken on the line 2—2 of Fig. 1.

In the exemplification of my watering device, shown in the accompanying drawings, I have used the reference numeral 10 to indicate generally an outer receptacle, which may be cylindrical in form, as shown, having the top 11, and the bottom 12. At the back of the casing 10, is a removable sliding door 13. The wall of the casing 10 near the upper end thereof, is provided with suitable openings 14 to provide circulation of air within the casing. Mounted on suitable supporting members 15 within the casing 10, and spaced from the side walls and top of said casing, is a water tank 16. The top 17 of the water-tank is inclined from its central point upwardly and downwardly from its circumference, as shown in Fig. 2. Preferably at the middle of the tank, there is provided from the center of the top 17, a downwardly extending tube 18, open at both ends. The opening at the upper end of the tube 18 is covered by a straining screen 19.

Mounted on the cover 17 is an annular ring 20 of larger diameter than the tube 18, and designed to close the space between the cover 17 and the cover 11. The cover 11 is provided with a central opening 21, which may be covered by a cover 22, on which is a handle 23, and a suitable fastening device 24, adapted to coact with the fastening device 25 on the cover 11. Extending upwardly from the cover 17 within the ring 20, is a short tube 26, in which is a suitable valve 27. The diameter of the opening 21 is less than the diameter of the ring 20.

At one side the tank 16 may be formed an inset chamber or portion 30. Below the inset portion 30 is a bottom 31. At the forward edge of the portion 31 is a front wall member 32, which extends outwardly and forwardly, but not to the upper portion of the inset portion 30. It will be seen that the inset portion 30 forms a receptacle or chamber, and that the lower part of the wall of the tank 16 around the inset portion 30 together with the bottom 31, and the front wall 32, forms a drinking trough.

In the front of the casing 10 an opening is cut away, and the walls of the casing 10 are bent inwardly at the side to form members 33, which extend to, and overlap the walls of the tank 16 at the sides of the chamber 30. A portion of the front wall of the casing 10 is inturned at the top of said casing at 34 to extend to, and slightly overlap the wall of the tank 16 at the top of the chamber 30, as clearly shown in Fig. 2.

In the wall of the tank 16 in the lower part of the chamber 30, is an opening below the level of the upper edge of the wall member 32, adapted to receive a screw threaded plug 35. The supporting members are of such proportion as to support the tank 16 within the casing 10 at a proper height, and to permit a lamp 36, or other suitable source of heat supply, to be placed in the lower part of the casing 10, below the drinking trough. Openings 37 may be left at the ends of the inturned portions 33 if desired, to permit air circulation.

It is desirable in raising many kinds of fowls and stock, to provide warm drinking water during the cold seasons of the year. The use of a watering device of the type herein described, makes it possible to furnish such warm water at a minimum expense and inconvenience.

In the practical use of my improved watering device, the tank 16 is filled with water in the following manner: The cover member 22 is moved to expose the opening 21. The plug 35 is screwed into the opening in the wall of the chamber 30, and the valve 27 is moved to position to open the passage 26. Water may then be poured into the space within the ring 20, and will pass downwardly through the tube 18. In this connection attention is called to the advantages of the use of the ring 20 of larger diameter than the opening 18, and arranged to fill the space between the cover members 17 and 11, and also to the fact that the edge of the cover 11 overlaps the ring 20, by which feature of construction, water poured into the space above the passage 18 is prevented from passing over the top of the tank 16, and down into the casing 10. Even if the ring 20 should be soldered to the cover 17 only in a few places, and some water would be permitted to flow upwardly along the cover 17, very little would reach the periphery of the tank 16, and the water would simply flow back down the inclined cover 17, and into the tube 18. The overlapping edge of the cover 11, also prevents splashing and loss of water.

It will be understood that water may be supplied to the tank in any suitable way. After the tank has been filled to the desired height, the screw plug 35 is taken out and the valve 27 is turned to close the passage 26. Water will flow out through the opening in the wall of the chamber 30 into the drinking trough until it reaches the top of said opening, and will then form a water seal, and no more water will flow out until the water in the trough is lowered to permit air into the trough 16 through said opening. In cold weather the lamp 36 or any other source of heat, may be employed for heating the water in the tank.

The openings, hereinbefore referred to, permit a proper circulation of air below, and around the tank 16. It will be noticed from the above description that there is an air space entirely around the tank 16, excepting at the point of the opening into the chamber 30. Even the front portion of the drinking trough is so inclined as to leave an air space between the member 32 and the wall of the casing 10.

I have found that it takes comparatively little heat to keep the water in my device sufficiently warm for drinking purposes, even in very cold weather. With the ordinary heated watering tank, the drinking trough is entirely outside the tank and casing, and the water in the trough is more exposed to cold weather and is more likely to freeze than my improved watering device, in which the trough is inclosed on three sides.

One of the advantages of my device, is the fact that a drinking trough is formed in a recess in the tank 16, so that water is warmed directly through the bottom of the trough insomuch as the lamp may be directly below the water which is most exposed. At the same time warm air has access to the tank 16 on all sides except outside the chamber 30. The fact that the drinking trough is inclosed within the receptacle or chamber, having only the one opening, also prevents any considerable passage or circulation of air over the water in the drinking trough, which makes it easier to keep the water in the tank at the proper temperature to prevent freezing thereof.

At the same time my improved watering device has another advantage over the ordinary trough, insomuch, as the opening in the trough is of proper size as to admit the head of a hog, for instance, while drinking, but will not permit the hog to place his feet in the drinking trough, as he might do in the case of the ordinary trough.

I have made a large number of drinking troughs of the type herein described, and have found that on account of the construction, hereinbefore referred to, that practically no dirt gets into the drinking trough, and that animals do not place their feet in such trough.

It will be understood that some changes may be made in the construction of my improved watering device without departing from its essential features and purpose, and it is my intent to cover by this application any such changes which may be included within the scope of my claims.

I claim as my invention:

1. In a watering device an outer receptacle, a tank therein, spaced therefrom on all sides, said receptacle and tank having registering inset portions forming a drinking trough, the inset portion of the tank having a top, sides, a bottom, and a front wall of less height than the inset portion, said tank inset portion having an opening below the level of the upper edge of said front wall adapted to receive a closure device, a movable closure device for said opening, said tank having an opening near its top, and an adjustable closure device for said last opening, the parts being arranged with a space below the drinking trough adapted to receive a heating element.

2. In a watering device an outer receptacle, a tank therein, spaced therefrom on all sides, said receptacle and tank having registering inset portions forming a drinking trough, the inset portion of the tank having a top, sides, a bottom, and a front wall of less height than the inset portion, said tank inset portion having an opening below the level of the upper edge of said front wall adapted to receive a closure device, a movable closure device for said opening, said tank having an opening near its top, an adjustable closure device for said last opening, a tube extending from the top of said tank downwardly into said tank, and a heating element under said drinking trough.

3. In a watering tank an outer receptacle, a tank therein, spaced therefrom on all sides, said receptacle and tank having registering inset portions forming a drinking trough, the inset portion of the tank having a top, sides, a bottom, and a front wall of less height than the inset portion, said tank inset portion having an opening below the level of the upper edge of said front wall adapted to receive a closure device, a movable closure device for said opening, the parts being arranged with a space below the drinking trough adapted to receive a heating element.

Des Moines, Iowa, October 14, 1914.

CLAYTON W. GRAHAM.

Witnesses:
  A. SHERMAN,
  J. MAHER.